(12) United States Patent
Wang et al.

(10) Patent No.: US 11,480,828 B1
(45) Date of Patent: Oct. 25, 2022

(54) DISPLAY DEVICE, BACKLIGHT MODULE, AND METHOD FOR ASSEMBLING DISPLAY DEVICE

(71) Applicant: AmTRAN Technology Co., Ltd., New Taipei (TW)

(72) Inventors: Chih Kuei Wang, New Taipei (TW); Hsien Kai Lin, Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 0 days.

(21) Appl. No.: 17/656,215

(22) Filed: Mar. 23, 2022

(30) Foreign Application Priority Data

Nov. 12, 2021 (TW) .................................. 110142274

(51) Int. Cl.
*G02F 1/13357* (2006.01)
*G02F 1/1333* (2006.01)

(52) U.S. Cl.
CPC .. *G02F 1/133606* (2013.01); *G02F 1/133314* (2021.01); *G02F 1/133325* (2021.01); *G02F 1/133603* (2013.01)

(58) Field of Classification Search
CPC ......... G02F 1/133606; G02F 1/133314; G02F 1/133325; G02F 1/133603
See application file for complete search history.

(56) References Cited

U.S. PATENT DOCUMENTS

| 2013/0044462 | A1* | 2/2013 | Cheng | G02B 6/005 362/97.1 |
| 2015/0277180 | A1* | 10/2015 | Seo | G02F 1/133602 349/58 |
| 2017/0097462 | A1* | 4/2017 | Lee | G02B 6/0088 |
| 2020/0064676 | A1* | 2/2020 | Liang | G02F 1/133602 |

FOREIGN PATENT DOCUMENTS

| CN | 106154646 A | 11/2016 |
| CN | 112764253 A | 5/2021 |
| JP | 2013196931 A | 9/2013 |
| TW | 201044077 A | 12/2010 |
| WO | 2014129369 A1 | 8/2014 |

\* cited by examiner

*Primary Examiner* — Evan P Dzierzynski
(74) *Attorney, Agent, or Firm* — CKC & Partners Co., LLC

(57) ABSTRACT

A backlight module includes a backplate, a light source, a diffuser plate, an optical film and at least one frame. The backplate includes a base plate, a sidewall and a bent portion. The sidewall is connected to the base plate and the bent portion. The bent portion has a first surface and a second surface. The first surface faces the base plate. The second surface is opposite to the first surface. The light source is disposed on the base plate. The diffuser plate is disposed on the second surface of the bent portion. The optical film is stacked on the diffuser plate and has a third surface away from the bent portion. The frame covers the sidewall of the backplate and covers a peripheral portion of the third surface of the optical film.

20 Claims, 9 Drawing Sheets

DISPLAY DEVICE, BACKLIGHT MODULE, AND METHOD FOR ASSEMBLING DISPLAY DEVICE

RELATED APPLICATIONS

This application claims priority to Taiwan Application Serial Number 110142274, filed Nov. 12, 2021, the disclosure of which is incorporated herein by reference in its entirety.

BACKGROUND

Technical Field

The present disclosure relates to a display device, a backlight module, and a method for assembling display device.

Description of Related Art

A backlight module of a display device typically includes at least one optical film to distribute the light emitted by the light source evenly across a display panel. A recent trend in the design of backlight module is to use mini-LED as the light source, which can not only achieve higher brightness but also reduce the thickness of the optical cavity, so direct lit type display devices can be overall slimmer with mini-LED backlight modules. However, the internal structures of current direct lit type mini-LED backlight modules are not simplified. Most designs of such backlight modules requires additional supporting members or extruded aluminum frames to clamp and hold the optical film. Assembling backlight modules having such designs requires laterally inserting the optical film into a groove structure manually. Therefore, such designs make assembling the backlight modules more difficult, and increase the risk of damaging the optical film as well.

SUMMARY

In view of the foregoing, one of the objects of the present disclosure is to provide a backlight module that has a simple structure and is easy to assemble.

To achieve the objective stated above, in accordance with an embodiment of the present disclosure, a backlight module includes a backplate, a light source, a diffuser plate, an optical film and at least one frame. The backplate includes a base plate, a sidewall and a bent portion. The sidewall is connected to the base plate and the bent portion. The bent portion has a first surface and a second surface. The first surface faces the base plate. The second surface is opposite to the first surface. The light source is disposed on the base plate. The diffuser plate is disposed on the second surface of the bent portion. The optical film is stacked on the diffuser plate and has a third surface away from the bent portion. The frame covers the sidewall of the backplate and covers a peripheral portion of the third surface of the optical film.

In one or more embodiments of the present disclosure, the sidewall extends along a periphery of the base plate and defines a chamber with the base plate. The sidewall has an outer surface facing away from the chamber. The bent portion extends in a direction away from the outer surface of the sidewall.

In one or more embodiments of the present disclosure, the bent portion is provided along at least two edges of the backplate.

In one or more embodiments of the present disclosure, the at least one frame includes a first frame and a second frame. The first frame is affixed to the backplate. The second frame covers the first frame.

In one or more embodiments of the present disclosure, the second frame includes a fixing portion. The fixing portion is located on a side of the base plate away from the diffuser plate and is secured to the base plate.

In one or more embodiments of the present disclosure, the base plate has an indented portion. The indented portion is located at an edge of the base plate. The fixing portion of the second frame is secured to the indented portion of the base plate.

In one or more embodiments of the present disclosure, the light source, the diffuser plate and the optical film are arranged in a direction. The sidewall of the backplate includes at least one protrusion portion extending in the direction and abutting against the at least one frame.

In one or more embodiments of the present disclosure, the optical film has a thru-hole. The backplate further includes a hanger. The hanger extends from the bent portion in a direction away from the base plate, and the thru-hole of the optical film is passed through by the hanger.

In accordance with an embodiment of the present disclosure, a display device includes the aforementioned backlight module and a display panel. The display panel is disposed on a side of the at least one frame away from the optical film.

In one or more embodiments of the present disclosure, the display panel is not covered by the at least one frame.

In accordance with an embodiment of the present disclosure, a method for assembling a display device includes: providing a backplate, the backplate including a base plate, a sidewall and a bent portion, the sidewall being connected to the base plate and the bent portion, wherein the bent portion has a first surface and a second surface, the first surface faces the base plate, and the second surface is opposite to the first surface; mounting a light source on the base plate in a way that the light source faces a first direction; moving a diffuser plate in an opposite direction of the first direction onto the second surface of the bent portion; moving an optical film in the opposite direction of the first direction onto the diffuser plate, the optical film having a third surface away from the bent portion; and covering the sidewall of the backplate and a peripheral portion of the third surface of the optical film with a first frame.

In one or more embodiments of the present disclosure, the method further includes: causing a thru-hole of the optical film to be passed through by a hanger of the backplate, wherein the hanger extends from the bent portion in a direction away from the base plate.

In one or more embodiments of the present disclosure, the method further includes: causing a thru-hole of the diffuser plate to be passed through by a hanger of the backplate, wherein the hanger extends from the bent portion in a direction away from the base plate.

In one or more embodiments of the present disclosure, the step of covering the sidewall of the backplate and the peripheral portion of the third surface of the optical film with the first frame includes: making the first frame abut against a hanger of the backplate, wherein the hanger extends from the bent portion in a direction away from the base plate.

In one or more embodiments of the present disclosure, the method further includes: moving a display panel in the opposite direction of the first direction onto the first frame.

In one or more embodiments of the present disclosure, the display panel is not covered by the first frame.

In one or more embodiments of the present disclosure, the method further includes: covering the first frame with a second frame and securing the second frame to an indented portion of the base plate.

In one or more embodiments of the present disclosure, the indented portion is located at an edge of the base plate.

In one or more embodiments of the present disclosure, the method further includes: moving a display panel in the opposite direction of the first direction onto the second frame.

In one or more embodiments of the present disclosure, the display panel is not covered by the second frame.

In summary, the backplate of the backlight module in the present disclosure is formed with a bent portion to support the diffuser plate and the optical film. By this arrangement, the diffuser plate and the optical film can be assembled into the backlight module by moving the diffuser plate and the optical film along a straight path. The assembly process of the backlight module does not involve bending or laterally inserting the diffuser plate and the optical film into any lateral slot. Accordingly, the assembly of the backlight module can be carried out more efficiently, and the assembly process would not cause damage to the diffuser plate and the optical film within the backlight module. Furthermore, a simplified structure for the backlight module is provided with the bent portion formed on the backplate to support the diffuser plate and the optical film. Consequently, the production cost of the display device can be reduced with the backlight module of the present disclosure, and the backlight module can be slimmer as well.

BRIEF DESCRIPTION OF THE DRAWINGS

To make the objectives, features, advantages, and embodiments of the present disclosure, including those mentioned above and others, more comprehensible, descriptions of the accompanying drawings are provided as follows.

DETAILED DESCRIPTION

Figure 1:
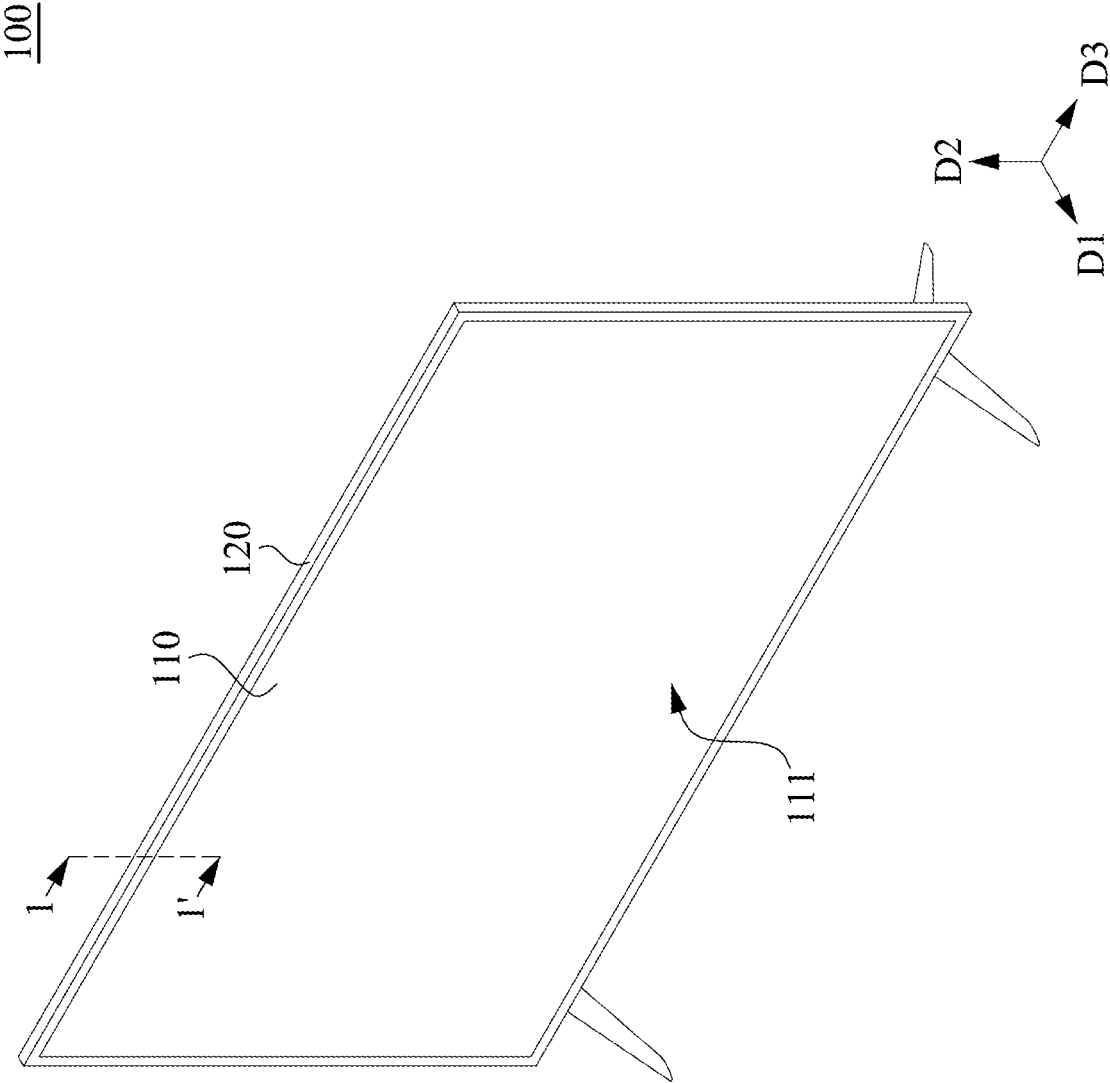
FIG. 1 illustrates an assembled view of a display device in accordance with an embodiment of the present disclosure.

For the completeness of the description of the present disclosure, reference is made to the accompanying drawings and the various embodiments described below. Various features in the drawings are not drawn to scale and are provided for illustration purposes only. To provide full understanding of the present disclosure, various practical details will be explained in the following descriptions. However, a person with an ordinary skill in relevant art should realize that the present disclosure can be implemented without one or more of the practical details. Therefore, the present disclosure is not to be limited by these details.

Figure 2:
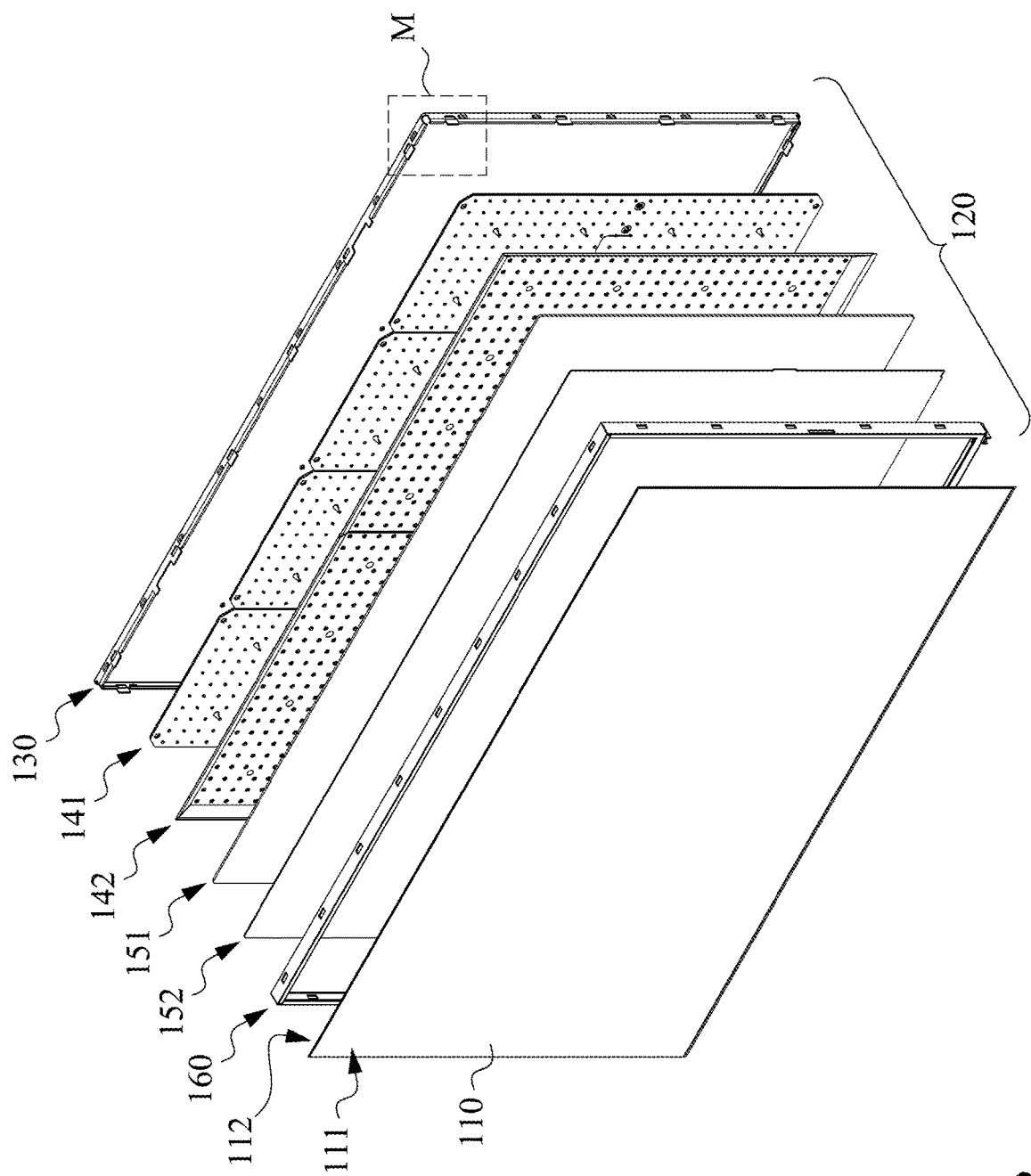
FIG. 2 illustrates an exploded view of the display device shown in FIG. 1.

Reference is made to FIG. 1. A display device 100 includes a display panel 110, e.g., an LCD panel, and a backlight module 120. The display panel 110 has a first surface 111 and a second surface 112 opposite to the first surface 111 as illustrated in FIG. 2. The first surface 111 is configured to outwardly display a screen. In other words, the first surface 111 is the display surface of the display panel 110. The display panel 110 is disposed on the backlight module 120 in a way that the first surface 111 faces away from the backlight module 120. The backlight module 120 is configured to illuminate the display panel 110, such that the display panel 110 can display visible images.

As shown in FIG. 1, for the convenience of description, the first direction D1 is defined as the direction which the first surface 111 of the display panel 110 faces, for example, the normal direction of the first surface 111 in FIG. 1. The second direction D2 is defined as the direction along which the short sides of the display device 100 extend, for example, the vertically upward direction in FIG. 1. The third direction D3 is defined as the direction along which the long sides of the display device 100 extend, for example, the horizontally rightward direction in FIG. 1. In some embodiments, the first, second and third directions D1, D2 and D3 are mutually orthogonal. It is noted that the first, second and third directions D1, D2 and D3 are define with respect to the display device 100. Accordingly, when the display device 100 is laid down as in FIGS. 4 to 9 rather than being held upright as in FIG.1, the first, second and third directions D1, D2 and D3 would rotate with the display device 100.

Figure 3:
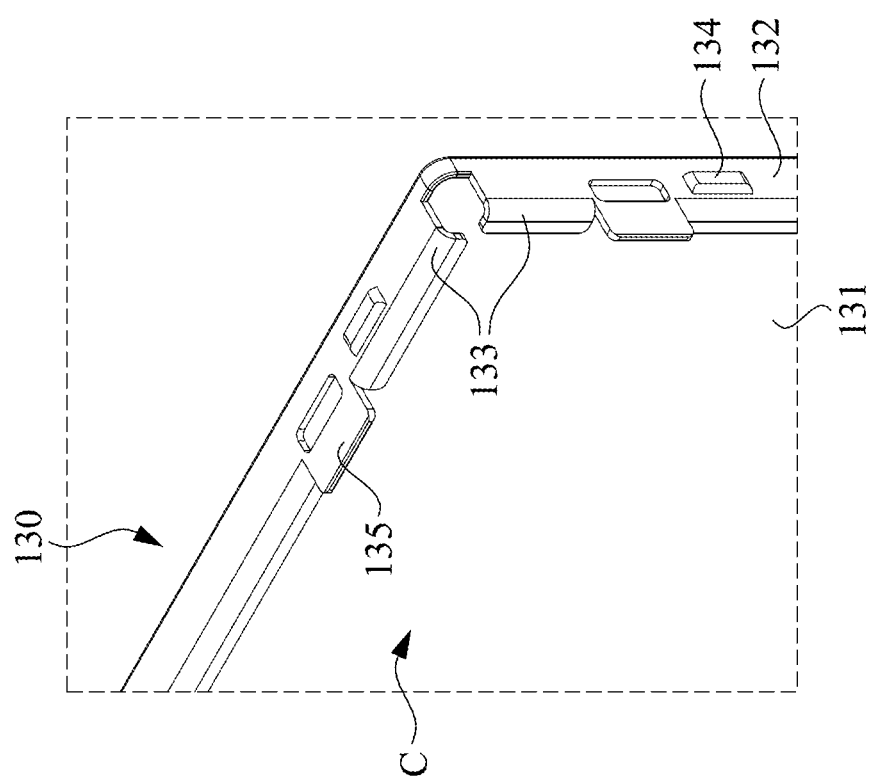
FIG. 3 illustrates an enlarged view of the display device shown in FIG. 2 in the area M.
Figure 4:
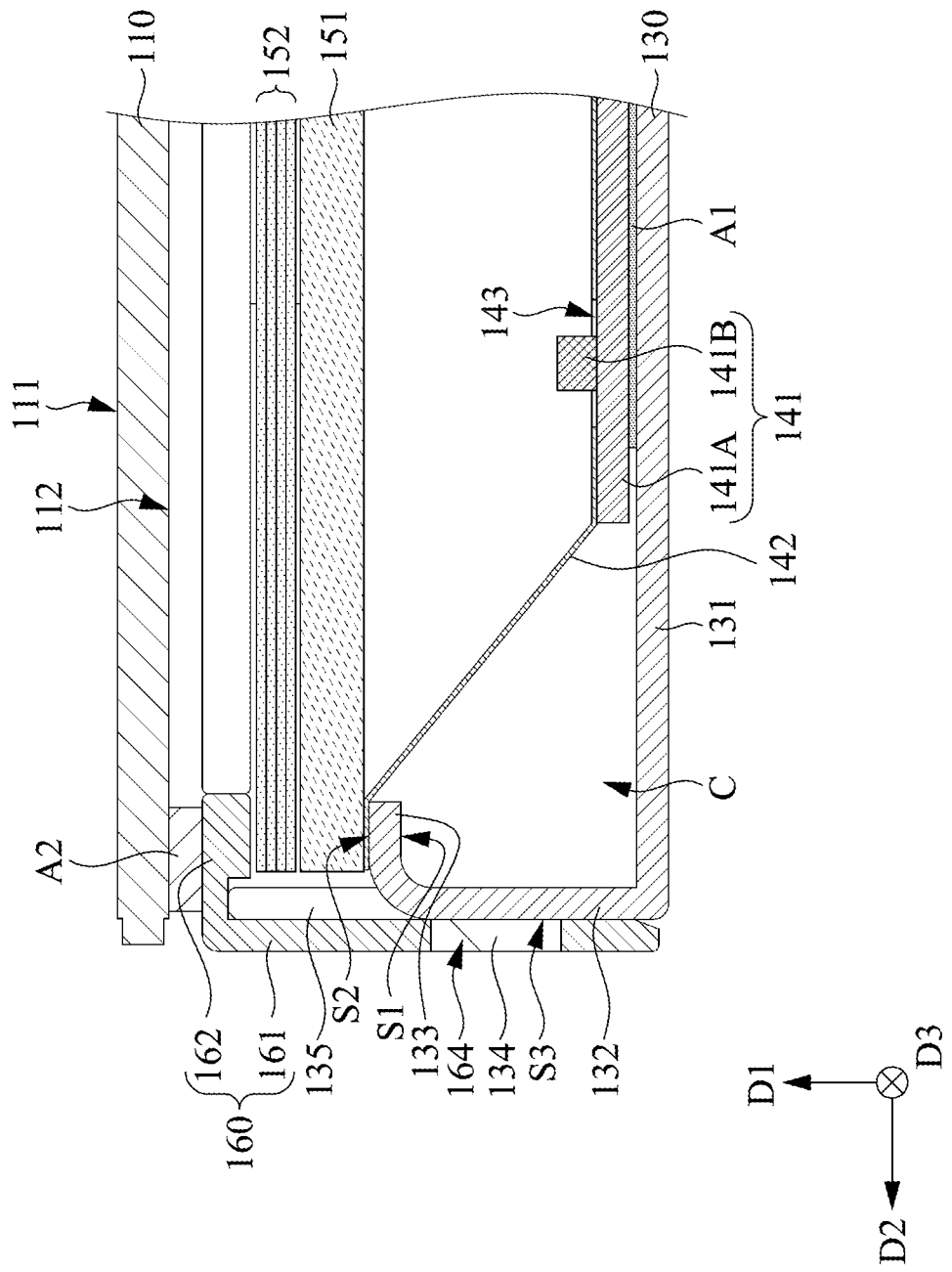
FIG. 4 illustrates a sectional view of the display device shown in FIG. 1 taken along line segment 1-1'.

Reference is made to FIGS. 2 to 4. The backlight module 120 includes a backplate 130 and a light source 141. The backplate 130 includes a base plate 131 and a sidewall 132. The sidewall 132 is connected to the base plate 131 and extends along a periphery of the base plate 131. The sidewall 132 and the base plate 131 define a chamber C. The light source 141 is disposed on the base plate 131 and is located in the chamber C. The light source 141 is oriented towards the first direction D1 and is configured to emit light towards the display panel 110.

As shown in FIGS. 2 to 4, in some embodiments, the light source 141 includes at least one LED light strip or LED light board. In some embodiments, the light source 141 includes a circuit board 141A and a plurality of LEDs 141B. The LEDs 141B may include mini-LED chips. The LEDs 141B are disposed in array on the circuit board 141A. In some embodiments, the light source 141 may be affixed to the base plate 131 via an adhesive A1.

As shown in FIGS. 2 to 4, in some embodiments, the backlight module 120 further includes a reflector sheet 142 disposed on the base plate 131 of the backplate 130. The reflector sheet 142 covers an inner surface of the backplate 130, and the reflector sheet 142 is configured to reflect the light directed toward the inner surface of the backplate 130 back to the display panel 110. In some embodiments, the reflector sheet 142 has one or more openings 143. When the light source 141 and the reflector sheet 142 are mounted on the base plate 131, the openings 143 of the reflector sheet 142 correspond to the positions of the LEDs 141B of the light source 141.

As shown in FIGS. 2 to 4, the backplate 130 further includes an inwardly-bent bent portion 133. The sidewall 132 is connected between the base plate 131 and the bent portion 133. The bent portion 133 has a first surface S1 and a second surface S2. The first surface S1 faces the base plate 131. The second surface S2 is opposite to the first surface S1. In some embodiments, the sidewall 132 has an outer surface S3 facing away from the chamber C, and the bent portion 133 extends in a direction away from the outer surface S3 of the sidewall 132.

As shown in FIGS. 2 to 4, in some embodiments, the bent portion 133 is provided along at least two edges of the backplate 130. For example, the bent portion 133 may be provided on the left and right sides of the backplate 130, the top and bottom sides of the backplate 130, or all four sides of the backplate 130. In some embodiments, the backplate 130 is a unitary metallic structure, which may be formed by means of sheet metal bending.

As shown in FIGS. 2 to 4, the backlight module 120 further includes a diffuser plate 151 and at least one optical film 152. The light source 141, the diffuser plate 151, the optical film 152 and the display panel 110 are arranged in the first direction D1. The diffuser plate 151 and the optical film 152 are located between the light source 141 and the display panel 110. The diffuser plate 151 is disposed on the second surface S2 of the bent portion 133, and the optical film 152 is stacked on the diffuser plate 151. In other words, the bent portion 133 supports the peripheral portions of the diffuser plate 151 and the optical film 152, e.g., the portions adjoin the outer boundaries or edges of the diffuser plate 151 and the optical film 152.

In the backlight module 120 of the present disclosure, the bent portion 133 is formed on the backplate 130 to support the diffuser plate 151 and the optical film 152. By this arrangement, the diffuser plate 151 and the optical film 152 can be assembled into the backlight module 120 by moving the diffuser plate 151 and the optical film 152 along a straight path, e.g., moving the diffuser plate 151 and the optical film 152 in the opposite direction of the first direction D1 to mount them on the backplate 130. Accordingly, the assembly of the backlight module 120 can be carried out more efficiently, and neither the assembly process nor the final assembled structure would cause damage to the diffuser plate 151 and the optical film 152. Furthermore, forming the bent portion 133 to support the diffuser plate 151 and the optical film 152 results in a simplified structure for the backlight module 120. Consequently, the production cost can be lowered based on the backlight module 120 of the present disclosure, and the backlight module 120 can have a slimmer thickness as well.

As shown in FIGS. 2 to 4, in some embodiments, the reflector sheet 142 extends obliquely from the base plate 131 to the second surface S2 of the bent portion 133. Accordingly, in addition to support the diffuser plate 151 and the optical film 152, the bent portion 133 also supports and holds the extended portion of the reflector sheet 142.

As shown in FIGS. 2 to 4, in some embodiments, the backlight module 120 further includes a first frame 160 disposed on or over the diffuser plate 151 and the optical film 152. The first frame 160 has a central opening that exposes most part of the optical film 152, and the first frame 160 covers the peripheral portions of the diffuser plate 151 and the optical film 152, such that the peripheral portions of the diffuser plate 151 and the optical film 152 are located between the first frame 160 and the bent portion 133 of the backplate 130. In some embodiments, the first frame 160 is a unitary plastic frame.

As shown in FIGS. 2 to 4, in some embodiments, the display panel 110 is disposed on the first frame 160 and the second surface 112 of the display panel 110 faces the diffuser plate 151 and the optical film 152. In some embodiments, the display panel 110 is affixed by an adhesive A2 to a side of the first frame 160 which is away from the optical film 152.

As shown in FIGS. 2 to 4, the first frame 160 is affixed or fixed to the backplate 130. In some embodiments, the first frame 160 includes a first covering portion 161 and a second covering portion 162. The first covering portion 161 is fixedly connected to the sidewall 132 and covers the outer side of the sidewall 132. The second covering portion 162 is connected to the first covering portion 161. The second covering portion 162 extends laterally to the surface of the optical film 152 away from the bent portion 133 and covers the peripheral portion of the optical film 152. The display panel 110 is disposed on the second covering portion 162 of the first frame 160. Specifically, the second covering portion 162 has two opposite surfaces, including a first surface and a second surface. The first surface of the second covering portion 162 faces the optical film 152, and the display panel 110 is disposed on the second surface of the second covering portion 162. Besides the second covering portion 162, the first frame 160 does not include any other laterally extending structure. Furthermore, the backlight module 120 does not include any laterally extending structure between the bent portion 133 and the second covering portion 162 either. Accordingly, during the assembly process of the backlight module 120, the diffuser plate 151 and the optical film 152 are placed onto the bent portion 133, one after another, and then the first frame 160 is provided over the diffuser plate 151 and the optical film 152, such that the peripheral portions of the diffuser plate 151 and the optical film 152 are covered by the second covering portion 162 of the first frame 160.

As shown in FIGS. 2 to 4, in some embodiments, the sidewall 132 of the backplate 130 includes at least one buckle structure 134. The buckle structure 134 is located on the outer side of the sidewall 132, i.e., the side away from the chamber C. The first covering portion 161 of the first frame 160 has at least one engaging slot 164. The buckle structure 134 engages with the engaging slot 164, such that the first frame 160 interlocks with the backplate 130.

As shown in FIGS. 2 to 4, in some embodiments, the sidewall 132 of the backplate 130 further includes at least one protrusion portion 135. The protrusion portion 135 extends beyond the bent portion 133 in the first direction D1 and is configured to support the first frame 160. In some embodiments, the protrusion portion 135 may also serve as a hanger for the diffuser plate 151 and/or the optical film 152. Specifically, the protrusion portion 135 extends in the first direction D1, passes through positioning holes in the peripheral portion of the diffuser plate 151 and/or the peripheral portion of the optical film 152, and abuts against the first frame 160. In some embodiments, the protrusion portion 135 abuts against the second covering portion 162 of the first frame 160. In some embodiments, the protrusion portion 135 abuts against a corner of the first frame 160 between the first covering portion 161 and the second covering portion 162.

In some embodiments, the sidewall 132 includes a plurality of protrusion portions 135 arranged along one or more edges of the backplate 130. For example, the protrusion portions 135 may be arranged in the second direction D2 on the left and right edges of the backplate 130, or in the third direction D3 on the top and bottom edges of the backplate 130.

Next, a method for assembling the backlight module 120 will be described with reference to FIGS. 5 to 7. The method for assembling the backlight module 120 includes steps B1-B5.

Figure 5:
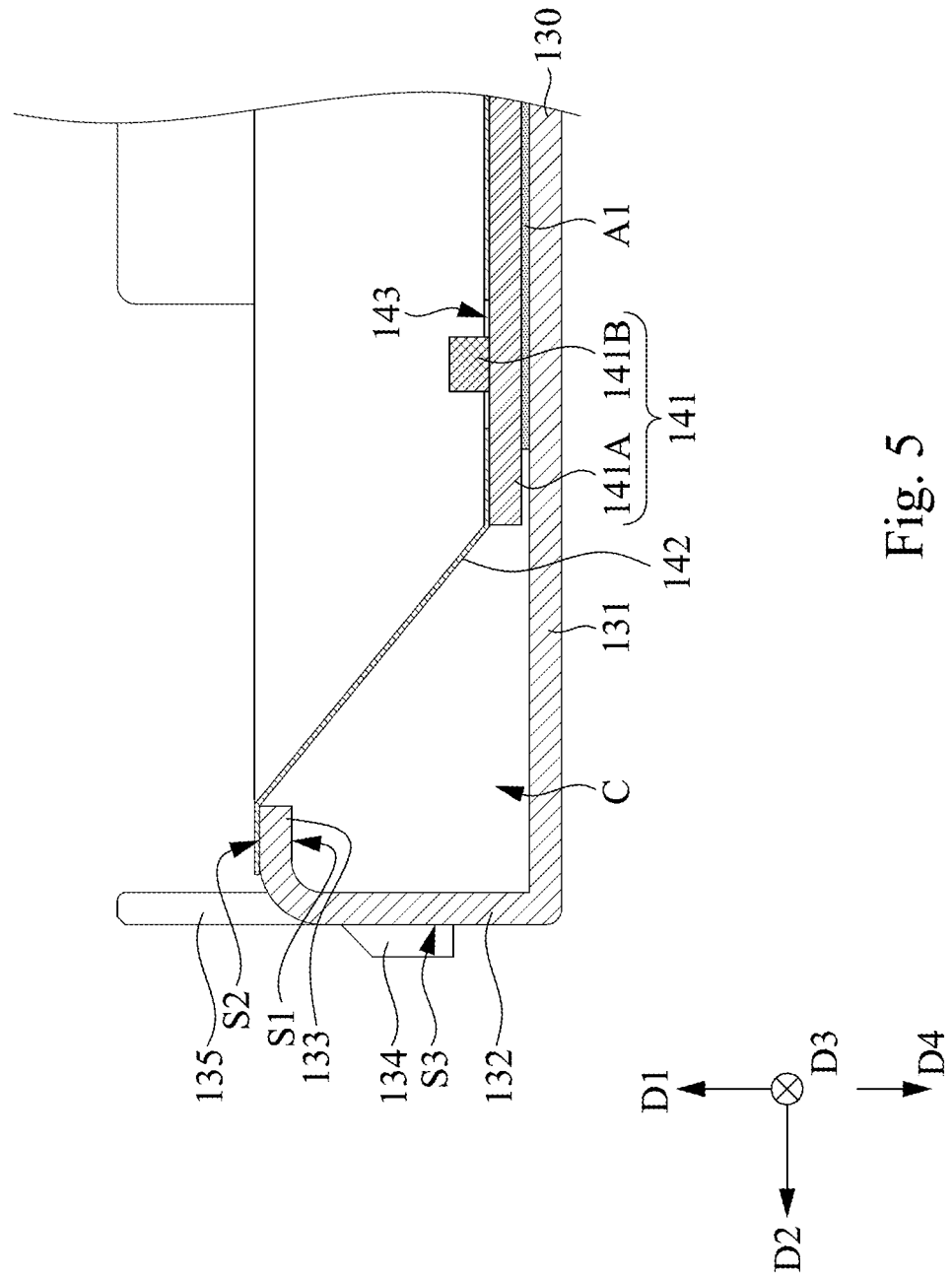
FIGS. 5 to 7 illustrate sectional views of the display device of FIG. 4 at various stages of the assembly process.

Firstly, in the step B1, the backplate 130 is laid down and faces upward as shown in FIG. 5 i.e., the backplate 130 faces the first direction D1 as shown in FIG. 5, and the light source 141 is mounted on the base plate 131 in a way that the light source 141 faces the first direction D1. In some embodiments, the step B1 also includes: attaching the light source 141 to the base plate 131 with the adhesive A1. In some embodiments, the step B1 further includes: after the light source 141 is mounted, moving the reflector sheet 142 in the opposite direction D4 of the first direction D1 onto the backplate 130, such that the reflector sheet 142 covers the inner surface of the backplate 130 and rests against the bent portion 133.

Figure 6:
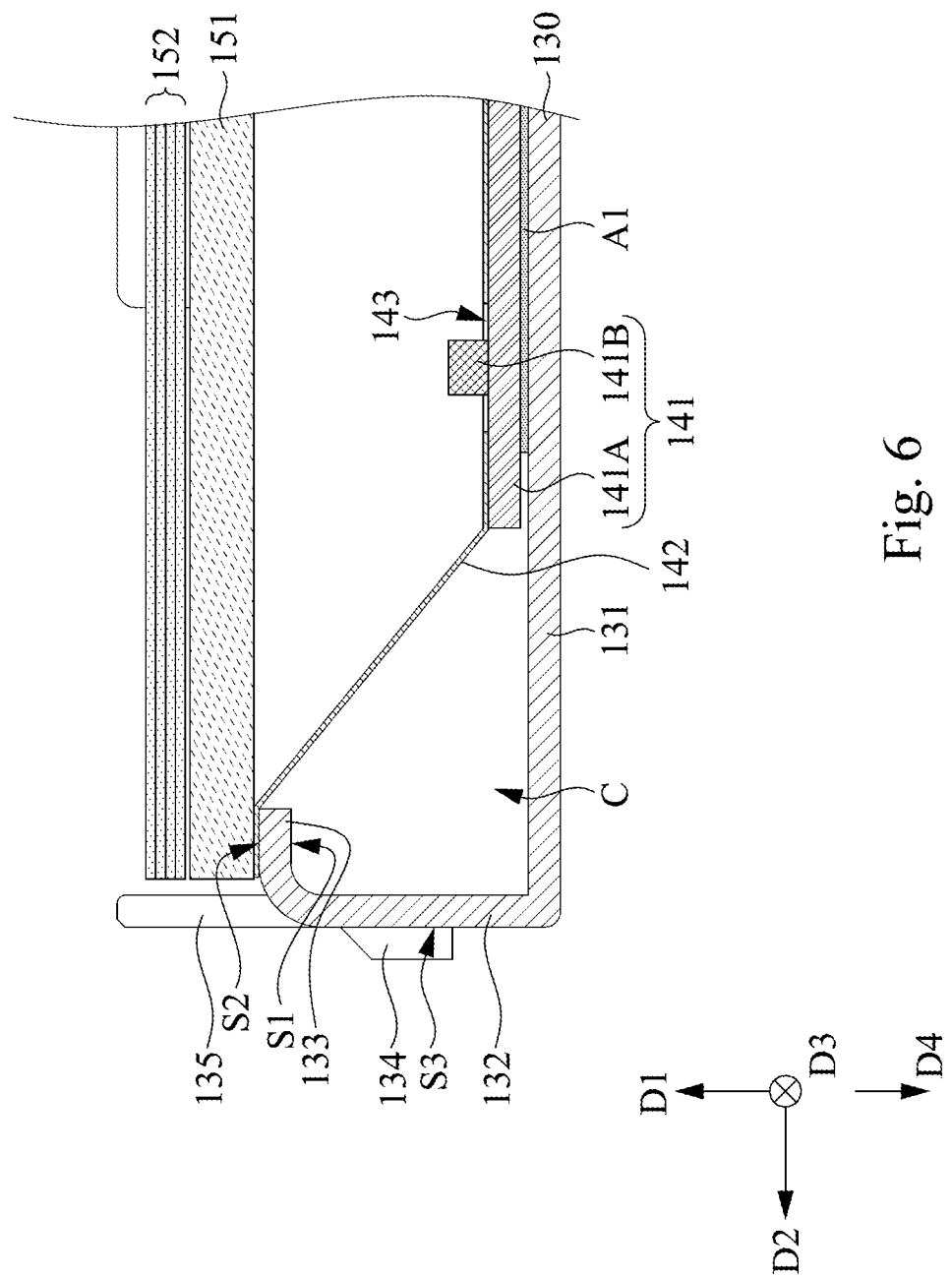
Figure 7:
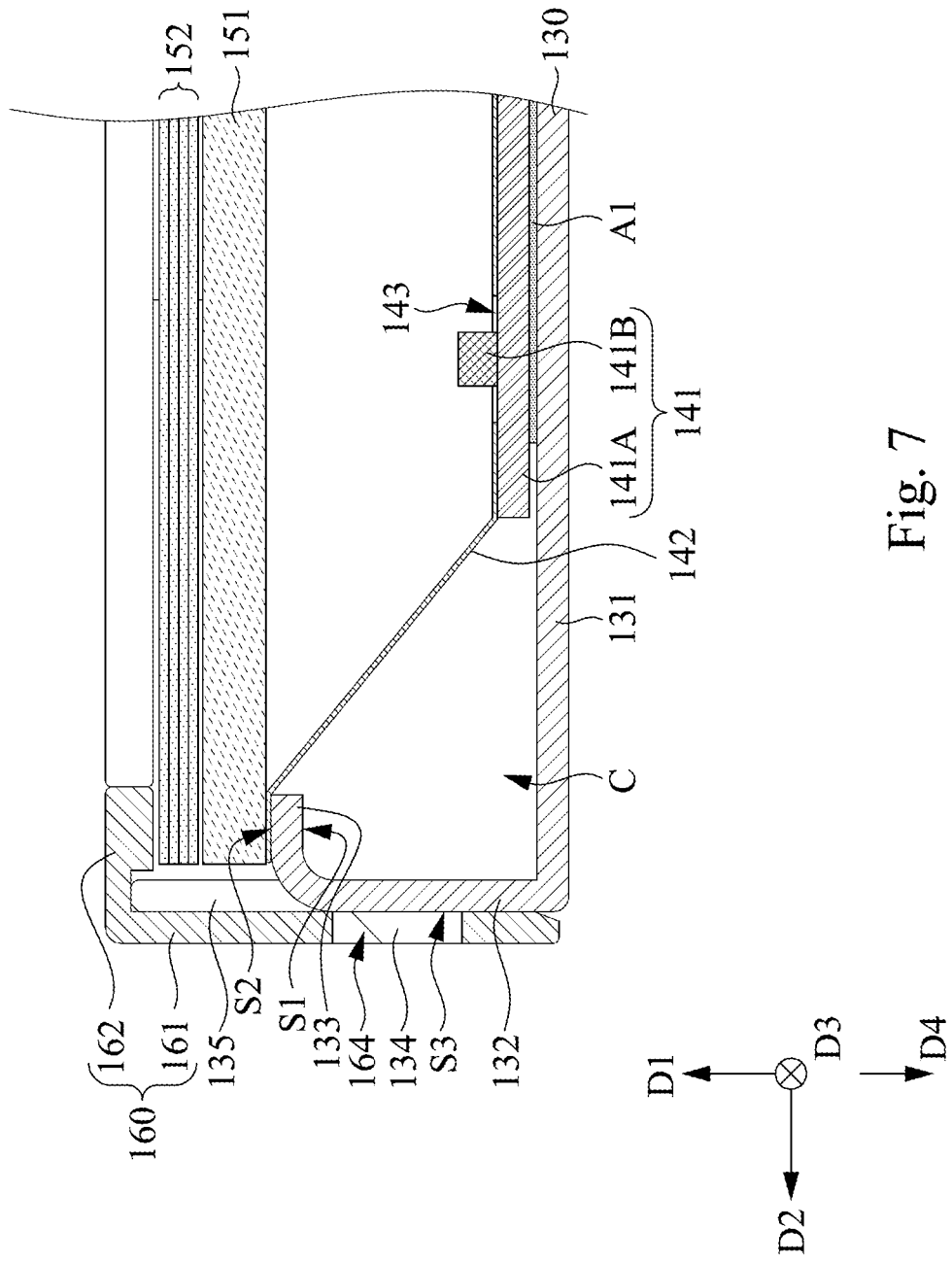

Next, in the step B3, the diffuser plate 151 is moved in the opposite direction D4 of the first direction D1 onto the second surface S2 of the bent portion 133 as shown in FIG. 6, and subsequently the optical film 152 is moved in the opposite direction D4 of the first direction D1 onto the diffuser plate 151.

At last, in the step B5, the first frame 160 is moved in the opposite direction D4 of the first direction D1 and is fixed to the backplate 130, such that the sidewall 132 of the backplate 130 and the peripheral portion of the surface of the optical film 152 away from the bent portion 133 are covered by the first frame 160. In some embodiments, the step B5 includes: engaging the engaging slot 164 of the first frame 160 with the buckle structure 134 of the backplate 130, such that the first frame 160 is fixed to the backplate 130.

Referring back to FIG. 4, in some embodiments, after the backlight module 120 is assembled, the display panel 110 may be fixedly attached to the first frame 160 to complete the assembly of the display device 100. In some embodiments, the display panel 110 may be combined with the backlight module 120 by moving the display panel 110 in the opposite direction D4 of the first direction D1 onto the first frame 160. In the assembled display device 100, the first frame 160 is located on a side of the display panel 110 away from the first surface 111 (i.e., the display surface). In other words, the display panel 110 is not covered by the first frame 160.

Figure 8:
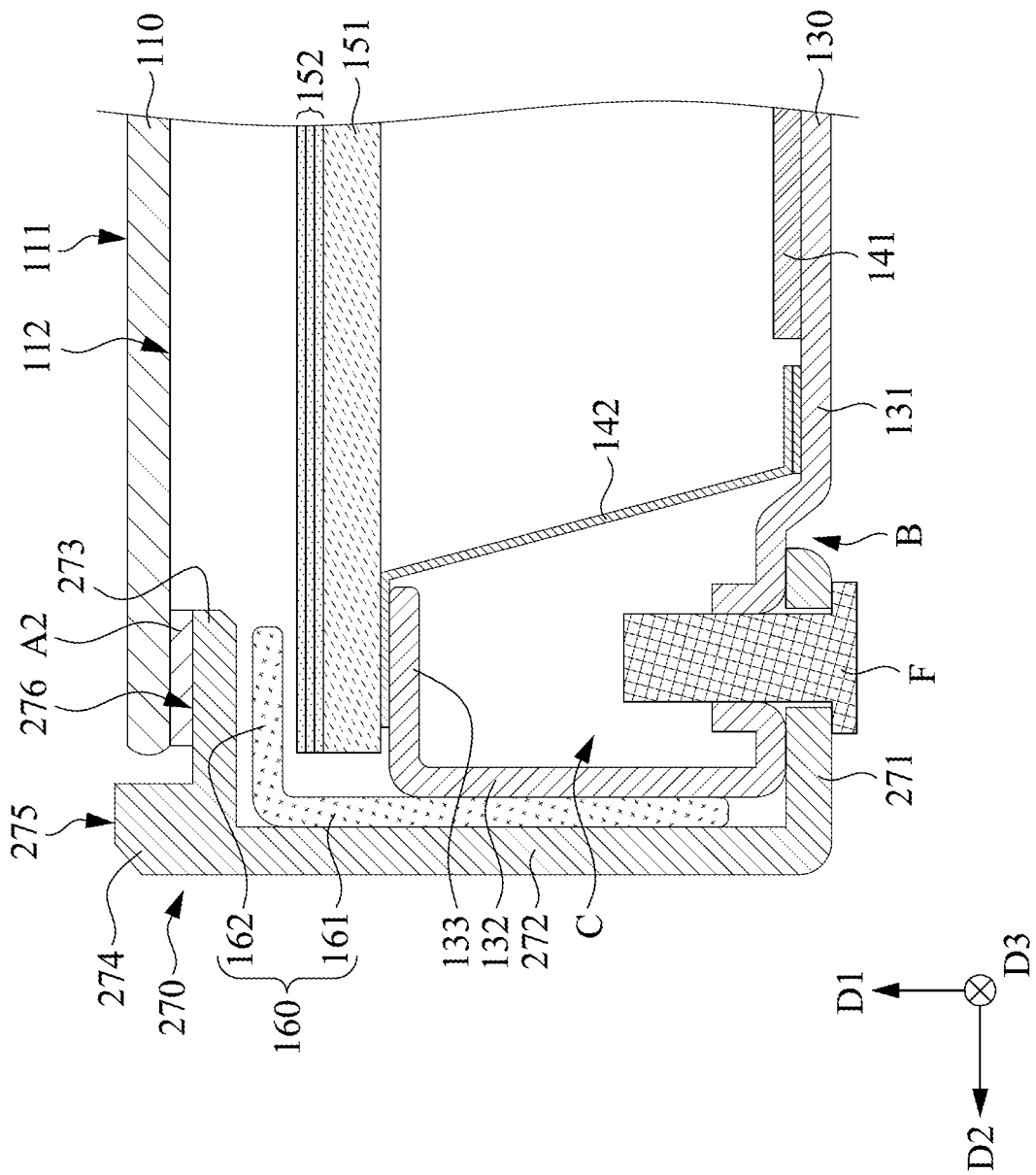
FIG. 8 illustrates a sectional view of a display device in accordance with another embodiment of the present disclosure.

Reference is made to FIG. 8, wherein the display device in the embodiment of FIG. 8 further includes a second frame 270 compared to the embodiment shown in FIG. 4. The second frame 270 covers the first frame 160 from the outside, such that the first frame 160, which is disposed on the backplate 130, is located between the second frame 270 and the backplate 130. In addition, unlike the embodiment shown in FIG. 4, the display panel 110 is disposed on the second frame 270 in the embodiment of FIG. 8. For example, the display panel 110 may be affixed by the adhesive A2 to the side of the second frame 270 which is away from the optical film 152. In some embodiments, the display panel 110 may be combined with the backlight module by moving the display panel 110 in the opposite direction of the first direction D1 onto the second frame 270. In the assembled display device, the second frame 270 is located on a side of the display panel 110 away from the first surface 111 (i.e., the display surface). In other words, the display panel 110 is not covered by the second frame 270.

As shown in FIG. 8, in some embodiments, the second frame 270 includes a fixing portion 271. The fixing portion 271 of the second frame 270 is secured to the base plate 131 and covers the periphery portion of the backplate 130 from the outside, i.e., the fixing portion 271 is fixed to the side of the base plate 131 away from the diffuser plate 151 and the optical film 152. In some embodiments, the fixing portion 271 is secured to the base plate 131 via one or more fasteners F (e.g., screws). In some embodiments, the peripheral portion of the base plate 131 is bent or dented with a certain depth, thereby forming an indented portion B on at least one edge of the base plate 131. The fixing portion 271 of the second frame 270 is secured to the indented portion B of the base plate 131. By this arrangement, securing the fixing portion 271 of the second frame 270 would not create any bump on the outer surface of the base plate 131.

As shown in FIG. 8, in some embodiments, the second frame 270 further includes a sidewall portion 272 and a plane portion 273. The sidewall portion 272 covers the first covering portion 161 of the first frame 160, which in turn covers the sidewall 132 of the backplate 130. The plane portion 273 is connected to the sidewall portion 272. The plane portion 273 covers the second covering portion 162 of the first frame 160, which in turn covers the peripheral portion of the surface of the optical film 152 away from the bent portion 133. The plane portion 273 is configured to support the display panel 110.

As shown in FIG. 8, in some embodiments, the second frame 270 further includes a bezel portion 274. The bezel portion 274 protrudes from the plane portion 273 and is arranged along the periphery of the display panel 110. The bezel portion 274 extends beyond the first surface 111 (i.e., the display surface) of the display panel 110 in the first direction D1, or aligns with the first surface 111. In other words, a distance, in the first direction D1, between the end surface 275 of the bezel portion 274 and the plane 276 of the plane portion 273, which is configured to support the display panel 110, is greater than or equal to a distance between the first surface 111 of the display panel 110 and the plane 276.

Figure 9:
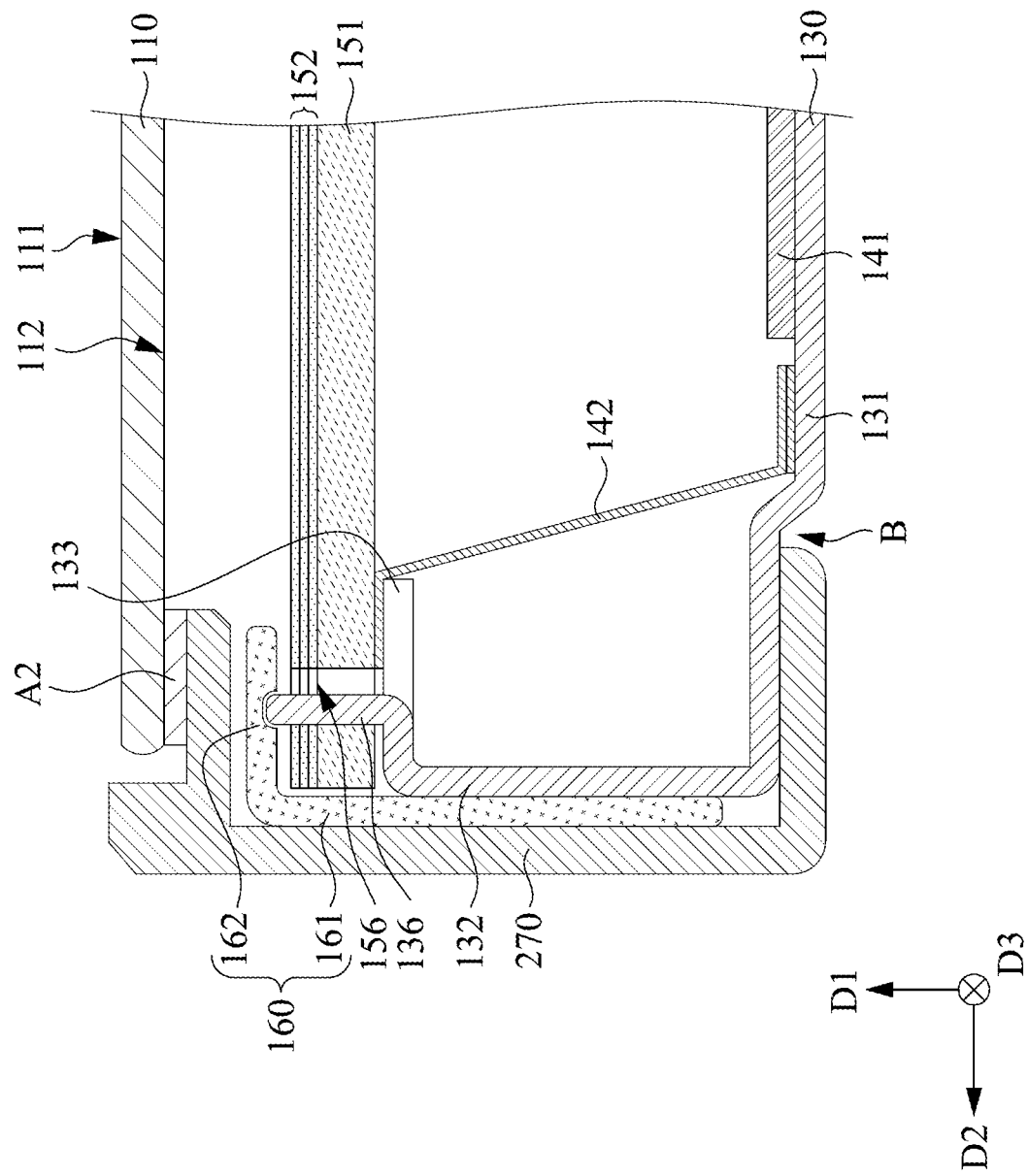
FIG. 9 illustrates another sectional view of the display device shown in FIG. 8, which is taken at a different location of the same display device.

Reference is made to FIG. 9. FIG. 9 illustrates another sectional view of the display device shown in FIG. 8, which is taken at a different location of the same display device. In some embodiments, the optical film 152 has at least one thru-hole 156. The backplate 130 includes at least one hanger 136. The hanger 136 extends from the bent portion 133 in a direction away from the base plate 131, e.g., the first direction D1. The thru-hole 156 of the optical film 152 is passed through by the hanger 136, and the optical film 152 is thereby secured in the backlight module. In some embodiments, the diffuser plate 151 has at least one thru-hole 156 passed through by the hanger 136. In some embodiments, the backplate 130 is provided with one or more hangers 136 of the bent portion 133 on its top side, i.e., the upper side of the backplate 130 when the display device is held upright. In some embodiments, the hanger 136 of the bent portion 133 supports the first frame 160, e.g., by abutting against the second covering portion 162 of the first frame 160. In some embodiments, besides the second covering portion 162, the first frame 160 does not include any other laterally extending structure. Furthermore, the backlight module does not include any laterally extending structure between the bent portion 133 and the second covering portion 162. Accordingly, during the assembly process of the backlight module, the diffuser plate 151 and the optical film 152 are placed onto the bent portion 133, one after another, and the thru-hole 156 of the optical film 152 is passed through by the hanger 136. Subsequently, the first frame 160 is mounted onto the hanger 136, such that the peripheral portions of the diffuser plate 151 and the optical film 152 are covered by the second covering portion 162 of the first frame 160.

In summary, the backplate of the backlight module in the present disclosure is formed with a bent portion to support the diffuser plate and the optical film. By this arrangement, the diffuser plate and the optical film can be assembled into the backlight module by moving the diffuser plate and the optical film along a straight path. The assembly process of the backlight module does not involve bending or laterally inserting the diffuser plate and the optical film into any lateral slot. Accordingly, the assembly of the backlight module can be carried out more efficiently, and the assembly process would not cause damage to the diffuser plate and the optical film within the backlight module. Furthermore, a simplified structure for the backlight module is provided with the bent portion formed on the backplate to support the diffuser plate and the optical film. Consequently, the production cost of the display device can be reduced with the backlight module of the present disclosure, and the backlight module can be slimmer as well.

Although the present disclosure has been described by way of the exemplary embodiments above, the present disclosure is not to be limited to those embodiments. Any person skilled in the art can make various changes and modifications without departing from the spirit and the scope of the present disclosure. Therefore, the protective scope of the present disclosure shall be the scope of the claims as attached.

What is claimed is:

1. A backlight module, comprising:
   a backplate comprising a base plate, a sidewall and a bent portion, the sidewall being connected to the base plate and the bent portion, wherein the bent portion has a first surface and a second surface, the first surface faces the base plate, and the second surface is opposite to the first surface;
   a light source disposed on the base plate;
   a diffuser plate disposed on the second surface of the bent portion;
   an optical film stacked on the diffuser plate and having a third surface away from the bent portion; and
   at least one frame covering the sidewall of the backplate and covering a peripheral portion of the third surface of the optical film.

2. The backlight module of claim 1, wherein the sidewall extends along a periphery of the base plate and defines a chamber with the base plate, the sidewall has an outer surface facing away from the chamber, and the bent portion extends in a direction away from the outer surface of the sidewall.

3. The backlight module of claim 1, wherein the bent portion is provided along at least two edges of the backplate.

4. The backlight module of claim 1, wherein the at least one frame comprises a first frame and a second frame, the first frame is affixed to the backplate, and the second frame covers the first frame.

5. The backlight module of claim 4, wherein the second frame comprises a fixing portion, the fixing portion is located on a side of the base plate away from the diffuser plate and is secured to the base plate.

6. The backlight module of claim 5, wherein the base plate has an indented portion, the indented portion is located at an edge of the base plate, the fixing portion of the second frame is secured to the indented portion of the base plate.

7. The backlight module of claim 1, wherein the light source, the diffuser plate and the optical film are arranged in a direction, the sidewall of the backplate comprises at least one protrusion portion extending in the direction and abutting against the at least one frame.

8. The backlight module of claim 1, wherein the optical film has a thru-hole, the backplate further comprises a hanger, the hanger extends from the bent portion in a direction away from the base plate, and the thru-hole of the optical film is passed through by the hanger.

9. A display device, comprising:
   the backlight module of claim 1; and
   a display panel disposed on a first side of the at least one frame, the first side being away from the optical film.

10. The display device of claim 9, wherein the display panel is not covered by the at least one frame.

11. A method for assembling a display device, comprising:
    providing a backplate, the backplate comprising a base plate, a sidewall and a bent portion, the sidewall being connected to the base plate and the bent portion, wherein the bent portion has a first surface and a second surface, the first surface faces the base plate, and the second surface is opposite to the first surface;
    mounting a light source on the base plate in a way that the light source faces a first direction;
    moving a diffuser plate in an opposite direction of the first direction onto the second surface of the bent portion;
    moving an optical film in the opposite direction of the first direction onto the diffuser plate, the optical film having a third surface away from the bent portion; and
    covering the sidewall of the backplate and a peripheral portion of the third surface of the optical film with a first frame.

12. The method for assembling a display device of claim 11, further comprising: causing a thru-hole of the optical film to be passed through by a hanger of the backplate, wherein the hanger extends from the bent portion in a direction away from the base plate.

13. The method for assembling a display device of claim 11, further comprising: causing a thru-hole of the diffuser plate to be passed through by a hanger of the backplate, wherein the hanger extends from the bent portion in a direction away from the base plate.

14. The method for assembling a display device of claim 11, wherein the step of covering the sidewall of the backplate and the peripheral portion of the third surface of the optical film with the first frame comprises: making the first frame abut against a hanger of the backplate, wherein the hanger extends from the bent portion in a direction away from the base plate.

15. The method for assembling a display device of claim 11, further comprising: moving a display panel in the opposite direction of the first direction onto the first frame.

16. The method for assembling a display device of claim 15, wherein the display panel is not covered by the first frame.

17. The method for assembling a display device of claim 11, further comprising: covering the first frame with a second frame and securing the second frame to an indented portion of the base plate.

18. The method for assembling a display device of claim 17, wherein the indented portion is located at an edge of the base plate.

19. The method for assembling a display device of claim 17, further comprising: moving a display panel in the opposite direction of the first direction onto the second frame.

20. The method for assembling a display device of claim 19, wherein the display panel is not covered by the second frame.

* * * * *